United States Patent
Jan (10) Patent No.: US 10,673,066 B2
(45) Date of Patent: Jun. 2, 2020

(54) RETICULATED ELECTRODE FOR LEAD-ACID BATTERY AND FABRICATION METHOD THEREOF

(71) Applicant: Jonathan Jan, Culver City, CA (US)

(72) Inventor: Jonathan Jan, Culver City, CA (US)

(*) Notice: Subject to any disclaimer, the term of this patent is extended or adjusted under 35 U.S.C. 154(b) by 92 days.

(21) Appl. No.: 15/864,383

(22) Filed: Jan. 8, 2018

(65) Prior Publication Data

US 2019/0109324 A1 Apr. 11, 2019

Related U.S. Application Data

(60) Provisional application No. 62/569,439, filed on Oct. 6, 2017.

(51) Int. Cl.
| | |
|---|---|
| *H01M 4/16* | (2006.01) |
| *C08L 75/04* | (2006.01) |
| *H01M 10/12* | (2006.01) |
| *C09J 129/04* | (2006.01) |
| *C09J 163/00* | (2006.01) |

(Continued)

(52) U.S. Cl.
CPC ............... *H01M 4/16* (2013.01); *C08L 75/04* (2013.01); *C09J 129/04* (2013.01); *H01M 4/0454* (2013.01); *H01M 4/664* (2013.01); *H01M 4/666* (2013.01); *H01M 4/82* (2013.01);

(Continued)

(58) Field of Classification Search
CPC ........ H01M 4/16; H01M 10/12; C09J 129/04; C09J 163/00; C08L 75/04; C08L 2203/20
See application file for complete search history.

(56) References Cited

U.S. PATENT DOCUMENTS

| | | |
|---|---|---|
| 4,600,481 A | 7/1986 | Sane et al. |
| 4,975,230 A | 12/1990 | Pinkhasov |

(Continued)

FOREIGN PATENT DOCUMENTS

WO    84/02723 A1    7/1984

OTHER PUBLICATIONS

Induceramic, "Ceramic Foam Filter Molten Metal Filtration", http://www.induceramic.com/industrial-ceramic-product/ceramic-foam-filter_molten-metal-filtration, 3 pages, printed from the Internet on Mar. 14, 2018.

(Continued)

*Primary Examiner* — Ula C Ruddock
*Assistant Examiner* — Matthew W Van Oudenaren
(74) *Attorney, Agent, or Firm* — Chen Yoshimura LLP (57) ABSTRACT

A method for fabricating a reticulated lead electrode for a lead-acid battery, including: preparing a molten metal in a container; applying a DC voltage to the molten metal and the substrate; while the DC voltage is applied, placing a reticulated ceramic substrate in the molten metal; while the DC voltage is applied, withdrawing the substrate from the molten metal; and cooling the substrate. The method may be used to form reticulated electrodes for other types of batteries or capacitors. Also described is a method for making a reticulated ceramic substrate, including: adhering mineral fibers such as milled glass fibers on the surfaces of a reticulated PU substrate with an adhesive; coating the reticulated PU substrate with a ceramic slurry with the assistance ultrasonic waves; pre-baking the dried slurry at a low temperature to vaporizes the polymer substrate; and baking the substrate at sintering temperature of the ceramic slurry.

9 Claims, 9 Drawing Sheets

(51) Int. Cl.
*H01M 4/04* (2006.01)
*H01M 4/66* (2006.01)
*H01M 4/82* (2006.01)

(52) U.S. Cl.
CPC ......... *H01M 10/12* (2013.01); *C08L 2203/20* (2013.01); *C09J 163/00* (2013.01)

(56) References Cited

U.S. PATENT DOCUMENTS

| | | |
|---|---|---|
| 5,190,897 A | 3/1993 | Azumi |
| 5,763,345 A | 6/1998 | Ohshima et al. |
| 6,060,198 A | 5/2000 | Snaper |
| 6,531,036 B1 | 3/2003 | Leitgeb et al. |
| 2004/0149569 A1* | 8/2004 | De Nora ............... C25C 3/08 |
| | | 204/243.1 |
| 2005/0100791 A1* | 5/2005 | Gyenge ............... C25D 3/56 |
| | | 429/236 |
| 2010/0248033 A1 | 9/2010 | Kumar et al. |
| 2018/0006290 A1 | 1/2018 | Snaper et al. |

OTHER PUBLICATIONS

Meijing Environmental Protection Ceramic Ltd., Ceramic Foam Filter, http://www.hceramic.com/products/Ceramic_Foam_Filters/, 1 page, printed from the Internet on Mar. 14, 2018.
International Search Report in related PCT application No. PCT/US2018/054336, dated Jan. 24, 2019.
Written Opinion in related PCT application No. PCT/US2018/054336, dated Jan. 24, 2019.
Taiwanese Office Action, dated May 17, 2019, in a counterpart Taiwanese patent application, No. TW 107135177.

* cited by examiner

RETICULATED ELECTRODE FOR LEAD-ACID BATTERY AND FABRICATION METHOD THEREOF

BACKGROUND OF THE INVENTION

Field of the Invention

This invention relates to rechargeable batteries, and in particular, it relates to an electrode for rechargeable lead-acid batteries or other types of batteries.

Description of Related Art

Lead-acid batteries use lead (Pb) as electrodes and sulfuric acid as electrolyte, where energy is stored in the electrolyte during the charge-discharge cycles. Conventional lead-acid batteries use lead plates (thin plates made of pressed powders) as the electrodes. Another type of lead electrodes uses a honeycomb structure formed of lead powder, e.g., thick plates formed of pressed powders then punched with a honeycomb structure.

Lead electrodes having a reticulated foam structure has also been described. For example, U.S. Pat. No. 6,060,198, issued May 9, 2000 to Snaper and entitled "Electrochemical battery structure and method," describes "A battery plate and a battery including the plate, the plate being a rigid reticulated conductive metal structure comprised of rigid elongated tendrils many of which meet in continuous intersections (apexes) of the tendrils to form dodecahedrons which form a conductive structure with pores and volumes to receive electrolyte. If desired a coating of battery materials can be adhered to the structure, still leaving open pores and volumes." (Abstract.) As mentioned in this patent, a useful aluminum reticulated plate was sold by ERG Corporation (http://www.ergaerospace.com/index.html). Electrodes having a reticulated structure have the advantages of reduced weight, increased surface area, and increased volume for the electrolyte.

Reticulated foam is a solid material having a very porous, low bulk density, three-dimensional connected mesh (net-like, open) structure. Reticulated foam materials are widely used for filters, scrubbers, covers, etc. For example, reticulated polyurethane materials are known and commercially available for a variety of practical applications. In other examples, reticulated ceramic material have been known and used, for example, as filters (sometimes referred to as ceramic foam filters) to filter molten metal, or used to hold catalyst for catalytic converters, etc. For example, a ceramic foam filter is described in U.S. Pat. No. 5,190,897. Reticulated ceramic materials are commercially available, for example, from Induceramic (http://www.induceramic.com/industrial-ceramic-product/ceramic-foam-filer_molten-metal-filtration), Meijing Environmental Protection Ceramic Ltd. (http://www.hceramic.com/products/Ceramic_Foam_Filerts/), etc.

SUMMARY

The present invention is directed to a method of fabricating a reticulated lead material useful for electrodes of lead-acid batteries and other applications. The method may also be used to form reticulated electrodes of other metals, for other types of batteries, or for other applications such as capacitors, etc.

According to an embodiment of the present invention, a thin layer of crystalline lead (Pb) (or other metal) is grown on the surfaces of a reticulated substrate, such as a reticulated ceramic substrate.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a method for fabricating a reticulated lead electrode for a lead-acid battery, which includes: obtaining a reticulated ceramic substrate; preparing a molten metal in a container; applying a DC voltage to the molten metal and the substrate; while the DC voltage is applied, placing the substrate in the molten metal; while the DC voltage is applied, withdrawing the substrate from the molten metal; and cooling the substrate. Other metals may be used.

In another aspect, the present invention provides a reticulated lead electrode fabricated using the above method.

In another aspect, the present invention provides a reticulated electrode for a battery, which includes: a substrate having a reticulated structure; and a layer of crystalline metal formed on surfaces of the reticulated substrate.

In another aspect, the present invention provides a method for fabricating a reticulated ceramic material, which includes: (a) obtaining a reticulated polyurethane substrate; (b) adhering mineral fibers on surfaces of the reticulated PU substrate using an adhesive; (c) coating the surfaces of the reticulated PU substrate obtained in step (b) with a ceramic slurry; (d) heating the coated reticulated PU substrate at a temperature between 250 C and 400 C to vaporize the PU substrate; and (e) heating the substrate at a sintering temperature of the ceramic slurry.

In another aspect, the present invention provides a method of making a positive electrode for lead-acid battery from a reticulated lead plate.

In yet another aspect, the present invention provides a lead-acid battery using the lead electrode plates made from the above methods.

It is to be understood that both the foregoing general description and the following detailed descriptions are exemplary and explanatory and are intended to provide further explanation of the invention as claimed.

DETAILED DESCRIPTION OF PREFERRED EMBODIMENTS

Embodiments of the present invention provides a process for fabricating a lead electrode having a reticulated structure.

First Embodiment: Method of Making a Lead Electrode Using a Reticulated Ceramic Substrate First, a reticulated ceramic substrate is obtained. As mentioned in the Background section, such materials (commonly referred to as ceramic foam filters) are known and commercially available. For example, the reticulated ceramic may be a reticulated polyurethane (or other polymer) material having a layer of a ceramic material deposited on the surfaces of the reticulated polyurethane material. (As the term is used in this disclosure, the surfaces of a reticulated structure include all inside surfaces, i.e., the surfaces of the open pores of the reticulated structure.) The ceramic may be silicon carbide, zirconium oxide, magnesia, alumina, etc. etc. The pore density of the reticulated ceramic substrate may be, for example, 10 to 90 pores per inch, or preferably 10 to 45 pores per inch; the porosity may be, for example, 70-95%, or preferably 80-90%. The substrate may have any desired shape and bulk size, depending on the intended application.

Many commercially available ceramic foam filters have a porosity of around 40-50%, which is not sufficiently high for this application. An improved method of making a high porosity reticulated ceramic substrate is described later in the second embodiment.

Lead is melted in a crucible (more generally, any suitable container). The crucible may be made of metal or graphite. Depending on the applications of the formed product, other metals may be used, such as zinc, copper, lithium, nickel, silver, etc., or metal alloys such as lead-tin (Pb—Sn), lead-antimony (Pb—Sb), iron-manganese (Fe—Mn), amalgam (alloy of mercury and another metal), etc. The description below uses lead as an example. Preferably, the temperature of the molten metal is slightly above the melting point of the metal, for example, up to 100 degrees C. above the melting point, and preferably 50-100 degrees C. above the melting point. For example, for lead (melting point 327.5 degrees C.), the temperature of the molten lead may be 328-400 degrees C., and preferably 327-385 degrees C. The molten metal does not need to be held at a constant temperature.

A DC voltage is applied to the molten metal and the reticulated ceramic substrate. More specifically, the positive end of a DC voltage source is coupled to the molten metal, such as by inserting an electrode into the molten metal, or by using an electrically conductive crucible and coupling the positive end of the DC voltage source to the crucible. More preferably, the positive end of the DC voltage source is coupled to multiple locations (e.g. all sides) of the electrically conductive crucible to create a more spatially uniform electrical potential inside the molten metal. The negative end of the DC voltage source is coupled to the reticulated ceramic substrate, e.g. by clamping the electrode to the substrate. The voltage of the DC voltage source may be between 1-200 V, preferably between 1-9 V, and more preferably between 1.5-3 V. It should be noted that the DC voltage may be a constant voltage or a waveform that is always positive.

While the DC voltage is applied, the reticulated ceramic substrate is dipped into the molten metal for a brief time period, and then smoothly withdrawn from the motel metal. The substrate only needs to be maintained in the molten metal for a short period of time; for example, about 3-10 seconds is sufficient, although longer time period may also be used, such as up to a minute or longer. The length of the time required is for substantially achieving thermal equilibrium of the substrate, so it may depend on the size of the substrate; longer dipping time does not substantially improve the subsequent layer formation effect. The substrate does not need to be pre-heated before dipping into the molten metal. When the substrate is dipped into the molten metal, the electrode that is coupled to the substrate should not be submerged in the molten metal. While a DC voltage exists between the substrate and the molten metal, the current that flows from the substrate to the molten metal may in fact be quite low because the ceramic substrate is not highly conductive.

When the substrate is withdrawn from the molten lead, the surface of the reticulated structure is coated with the molten lead. It is believed that the electrostatic potential between the substrate and the molten lead may help the attract lead to the surface of the reticulated substrate, and helps lead to remain on the surface of the reticulated structure. It is believed that lead starts to crystallize (i.e. undergo phase change, or a natural self-assembly process) almost immediately after the substrate (or the portion of the substrate) is withdrawn from the molten lead. After it is withdrawn from the molten lead, the substrate cools off by the ambient air, and within seconds or minutes, the substrate and the lead cools sufficiently to complete the formation of crystalline lead on the surface of the reticulated substrate. Thus, in the withdrawing step, the substrate should be withdrawn smoothly from the molten lead so as not to disturb lead crystal growth on the substrate and not to form turbulence in the molten lead in the crucible. It is typically not necessary to provide additional cooling, such as forced air cooling or other cooling technique, for the substrate after it is withdrawn from the molten lead. Because the substrate is a reticulated structure, it can cool efficiently by natural cooling at ambient temperature.

The dipping, withdrawing and cooling steps may be repeated to form thicker layers of lead on the substrate.

In some embodiments, the thickness of the lead formed on the reticulated substrate is between 10 microns and 2 mm.

Figure 1:
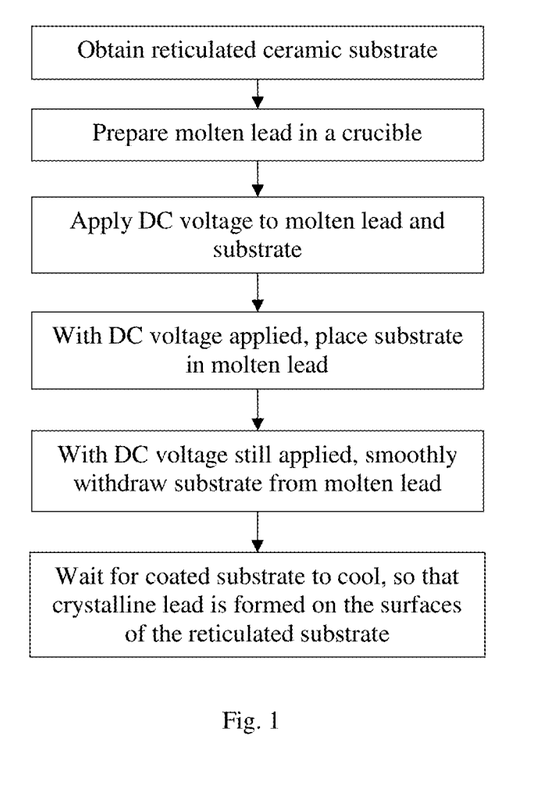
FIG. 1 schematically illustrates a method for fabricating a reticulated lead electrode according to a first embodiment of the present invention.

The fabrication process is summarized in FIG. 1. A reticulated lead plate is formed by this process, and can be used to make electrodes for batteries.

Figure 2:
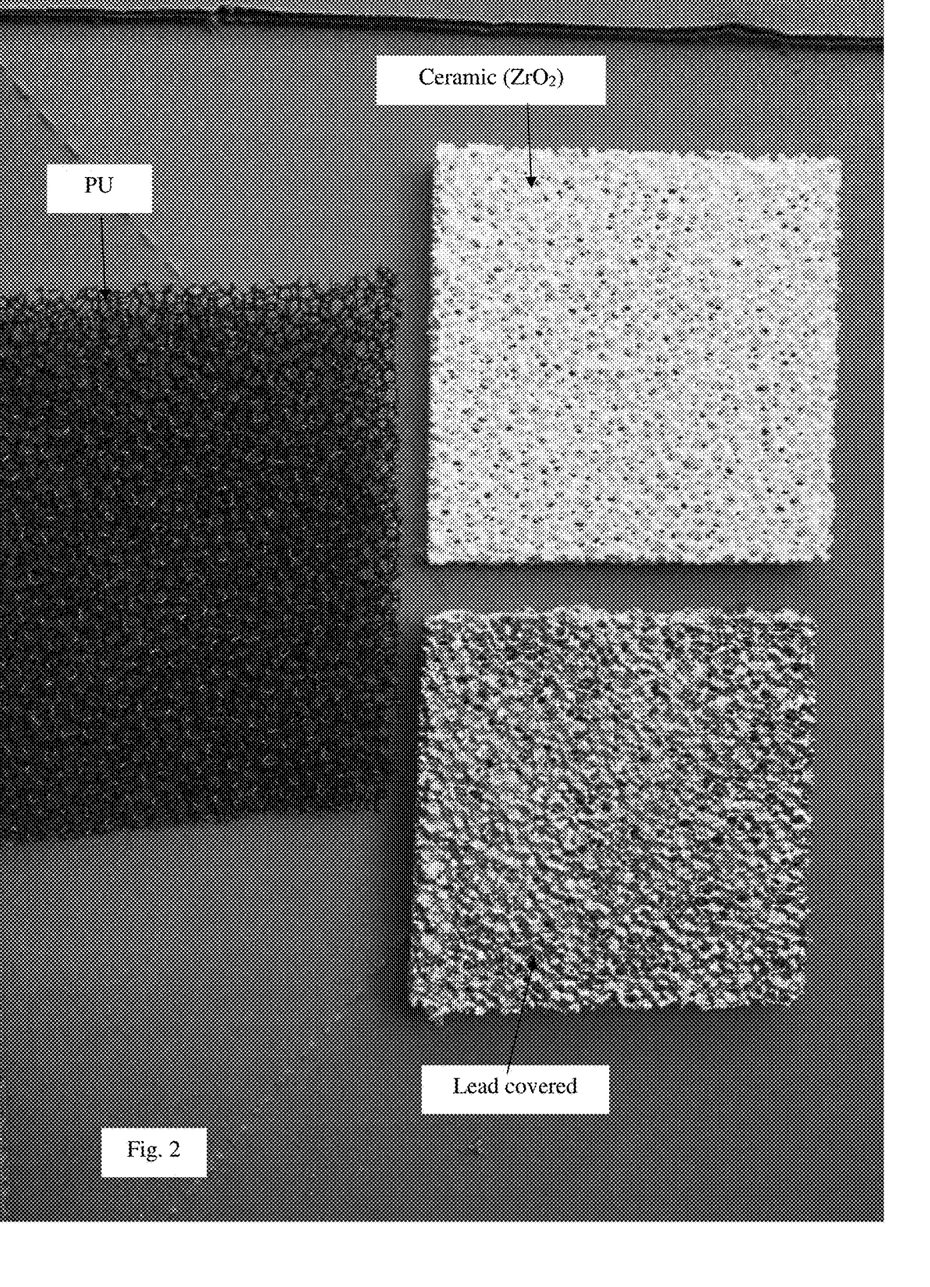
FIG. 2 is a photograph showing a piece of reticulated polyurethane material ("PU"), a piece of reticulated ceramic material ("Ceramic ($ZrO_2$)") useful as the ceramic substrate in a fabrication method according to embodiments of the present invention, and a product ("Lead covered") fabricated using the fabrication method.
Figure 3:
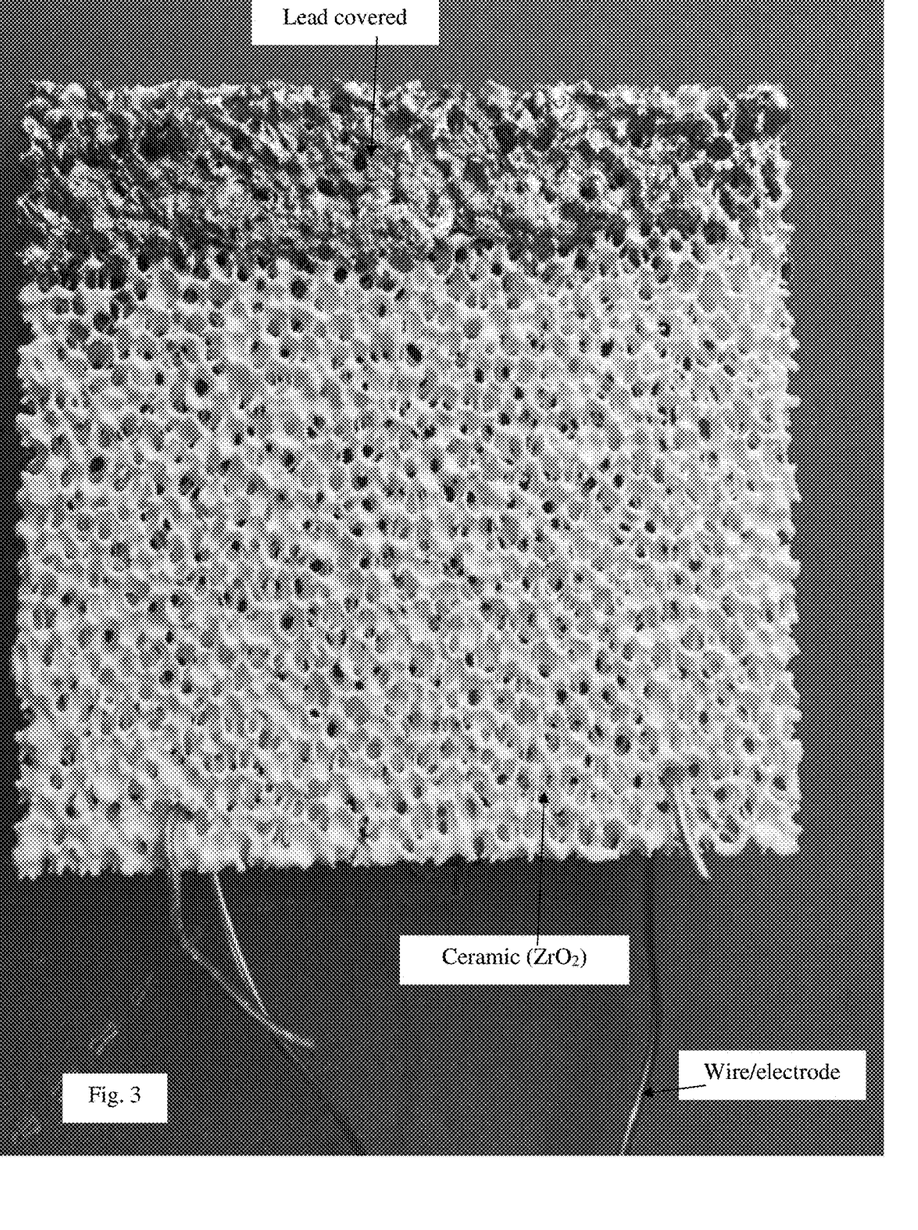
FIG. 3 is a photograph showing a ceramic substrate ("Ceramic ($ZrO_2$)") partially covered with lead ("Lead covered"), as well as a metal (copper) wire used as an electrode ("Wire/electrode") to apply a voltage to the substrate during fabrication.
Figure 4:
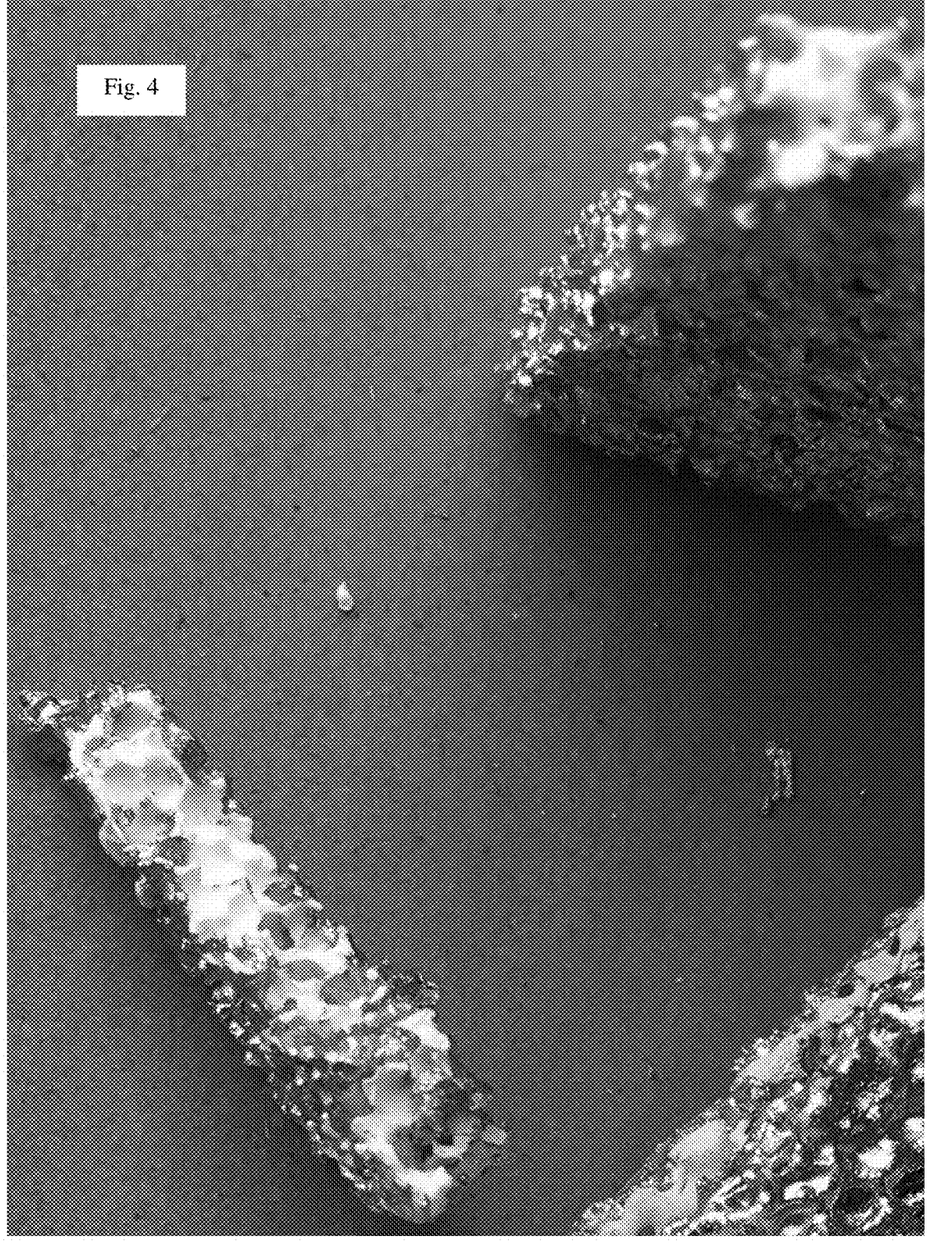
FIG. 4 is a photograph showing a several pieces of lead covered material fabricated using the fabrication method, include one broken-off piece showing the interior pores of the substrate being covered by lead.

Experiments showed that using the above described method, a layer of lead can be formed uniformly and homogeneously on all surfaces throughout the reticulated substrate structure. FIGS. 2, 3 and 4 show various examples of the substrate and the lead-covered substrate fabricated using the above-described method.

The lead electrode fabricated using the above described method has the following structure: A substrate having a reticulated structure, and a layer of crystalline lead formed on the surfaces of the reticulated substrate. The reticulated substrate is a reticulated ceramic substrate. In one example, the reticulated ceramic substrate is a reticulated polyurethane material with a layer of ceramic material deposited on the surface of the reticulated polyurethane material. In another example, the reticulated ceramic substrate is a reticulated structure made of ceramic (i.e. no polyurethane).

An important aspect of the above embodiment is to grow a crystalline structure on the reticulated substrate. The crystalline structure is important for the battery electrode application because crystals have excellent "memory" of its structure. In other words, it can maintain the original structure after numerous deep charge-discharge cycles without precipitating into the electrolyte. In comparison, in a powder-based lead electrode structure, the lead structure tends to fall apart over extended use. This is because in a lead and sulfuric acid based battery, the electrode changes between $PbSO_4$ and Pb or $PbO_2$. More specifically, in the discharged state, both the negative electrode (anode) and the positive electrode (cathode) become lead sulfate ($PbSO_4$); in the charged state, the negative electrode is lead (Pb) and the positive electrode is lead dioxide ($PbO_2$). Thus, over numerous charge-discharge cycles, the lead in the powder based electrode structure can disintegrate and fall off. This results in precipitation, i.e. the powder that falls off from the electrode can accumulate at the bottom of the battery, which is the major cause of battery failures. The electrodes having crystalline lead structure according to embodiments of the present invention prevent such problems, therefore extending the battery life.

Other advantages of reticulated electrodes include:

Low volume ratio: In conventional lead-acid batteries using lead plates, the volume ratio is about 30% electrolyte and 70% electrode. Using electrodes according to embodiments of the present invention, the ratio can be about 80% electrolyte and 20% electrode. This results in increased energy storage efficiency. It can also reduce the amount of lead needed, and reduced weight.

High surface area: The surface area of the electrode is more than 10 times that of lead plate electrodes for the same bulk size. Therefore, much greater maximum surge currents can be achieved.

Favorable mechanical properties: The hard porous ceramic substrate covered with soft metals resembles the structure of animal bones; this type of structure can tolerate pounding, vibration and other abuses.

Other favorable properties: Existing batteries all use a grid-type current collector mechanically attached to the electrodes, therefore increasing the internal resistivity of the battery. The reticulated lead crystalline electrode according to embodiments of the present invention has an internal resistivity of about 0.2 ohms, comparable to copper and nickel, and does not require a current collector.

The method is not limited to forming lead electrodes for lead-acid batteries. As mentioned earlier, the method may be used to form reticulated structure covered with other metals or metal alloys, such as lithium, zinc, nickel, silver, Fe—Mn, Pb—Sn, Pb—Sb, amalgam, etc., which may be used as electrodes for other types of batteries, or for other applications, such as capacitors, etc.

Second Embodiment: Improved Method of Making a Reticulated Ceramic Material

As mentioned earlier, reticulated ceramic materials, or ceramic foam filters, are known. As their main application is for filtering molten metals, the porosity is important; however, conventional ceramic foam filters often have uneven structural thickness, which adversely affects the performance and capacity of the battery when such reticulated ceramic materials are used as a substrate for making battery electrodes. Therefore, the second embodiment of the present invention provides an improved method of making reticulated ceramic material.

Conventionally, reticulated ceramic materials (commonly referred to as ceramic foam filters) are made by depositing clay on a polymer substrate, such as PU (polyurethane). The process is described in, for example, U.S. Pat. No. 5,190,897. However, the ceramic foam filter made with this process is not uniform and lacks structural strength. A "reticulated" architecture is a 3-dimensional "tubular" network. The improved method described below can achieve uniform wall thickness and improved tensile strength of the ceramic skeleton.

The method starts with a reticulated PU substrate which is commercially available. Preferably, the pore density of the reticulated PU substrate is 10-90 pores per inch, or more preferably 10-45 pores per inch, and the porosity is 80-90%.

Figure 6A:
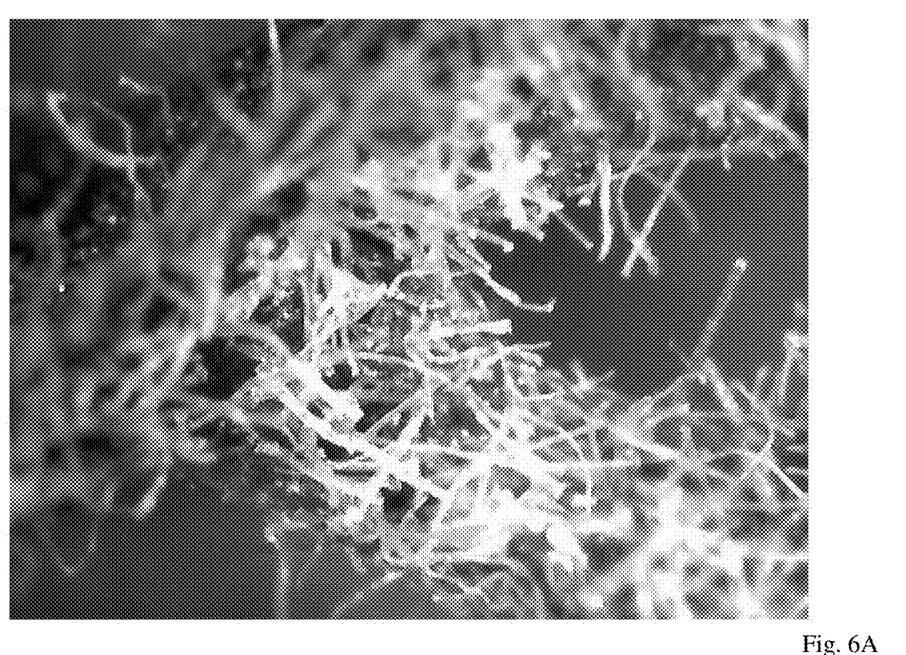
FIGS. 6A and 6B are photographs at different magnifications showing milled glass fiber on the reticulated PU substrate after the priming step in a process according to the second embodiment.
Figure 6B:
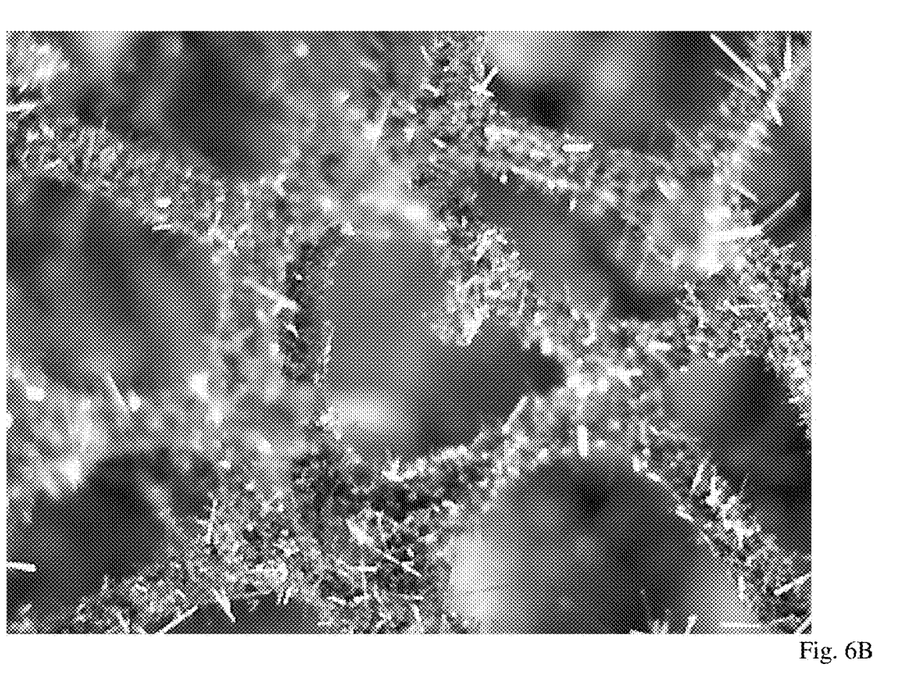

First, adhere mineral fibers, such as glass fibers, ceramic fibers, etc., on the surfaces of the reticulated substrate using an adhesive, such as a PVA (polyvinyl alcohol) type adhesive. The adhesive may be either water-based or solvent-based. Upon drying and curing, the reticulated PU substrate becomes stiffened with "fuzzy" surfaces due to the mineral fibers. The mineral fiber also serves as reinforcement of the ceramic to be formed on the substrate. This is referred to as a priming step. FIGS. 6A and 6B are photographs at different magnifications showing milled glass fiber on the reticulated PU substrate after the priming step.

In a preferred embodiment, the fibers used in the priming step are milled glass fibers (finely cut fiberglass filaments) having a thin polymer coating, which makes them easy to adhere to the PU substrate as well as the slurry in the subsequent step. In the preferred embodiment, the glass fibers are about 2-5 microns in diameter, and about 30-800 microns in length. Such milled glass fibers are commercially available. Glass fiber softens at about 1200 C. Even if in the subsequent step the ceramic is cured at higher temperature than the glass fiber softening temperature, the gel-like glass will fill the pores of the ceramic, further strengthening the structure.

The priming step may be accomplished in two ways.

First implementation: Apply an adhesive to the surfaces of the reticulated PU substrate. Disperse loose milled mineral fiber onto the wet surface of the reticulated PU substrate, for example, by blowing the fiber with low pressure compressed air through the reticulated PU substrate. Alternatively, the wet reticulated PU substrate may be simply placed (buried) in a volume of loose milled mineral fiber and shaken. In another alternative of this implementation, an epoxy glue is used as the adhesive, which can be sprayed onto the reticulated PU substrate. The epoxy glue is allowed to dry slightly for about 10-30 seconds, before the substrate is placed in the loose milled mineral fiber. This may be referred to as the "dusting" method. The adhesive is allowed to dry and cure.

Second implementation: Disperse the mineral fiber in a PVA type adhesive. The amount of mineral fiber in the adhesive may be 2:1 to 1:2 by volume, and preferably, about 1:1 by volume. The amount of mineral fiber to adhesive may depend on the thickness of the adhesive, as more fiber may be dispersed in a thinner adhesive. In one specific example of preparing a suitable adhesive, a low molecular weight PVA 088-05 and a high molecular weight PVA 26-99 are dissolved in water, in the proportion of 30 g each for 1 L water, while heating slowly (without boiling) and stirring until fully dissolved. Immerse the reticulated PU substrate in the adhesive with dispersed mineral fiber. The adhesive is allowed to dry and cure.

The first implementation is more preferred as it is more controllable in the distribution of the fiber. In the second implementation, uniformly dispersing the mineral fiber in the adhesive suspension may be difficult to achieve.

Then, coat the primed reticulated PU substrate with a ceramic slurry that will be sintered to form a ceramic, by submerging the substrate in a container with the slurry, and applying ultrasonic waves to the slurry using an array of ultrasonic transducers. Applying ultrasonic waves ensures uniform and dense deposit of the slurry on the substrate, as ultrasonic waves reduce the surface tension of the slurry while depleting gas bubbles from the slurry. Desirable wall thickness can be accomplished by adjusting the time the substrate spends in the container. In a preferred embodiment, this step is carried out for 1 to 10 hours. The Preferred range of ultrasonic frequency is 20 KHz-40 KHz, and the preferred ultrasonic power density is 20 mW/ml-100 mW/ml.

Some examples of the composition of the ceramic slurry are as follows:

Example 1

30-65 wt % of fine amorphous silica, 30-65 wt % of alumina trihydrate, 2-20 wt % of any one or more species of sepiolite, palygorskite, and bentonite, and 1-3 wt % of fumed silica.

Example 2

30-65 wt % of fine amorphous silica, 30-65 wt % of zirconium oxide, 2-20 wt % of any one or more species of sepiolite, palygorskite, and bentonite, and 1-3% wt % of fumed silica.

Example 3

30-65 wt % of fine amorphous silica, 30-65 wt % of silicon carbide, 2-20 wt % of any one or more species of sepiolite, palygorskite, and bentonite, and 1-3% wt. of fumed silica.

In the above examples, the fumed silica (micron silica) is formulated into the slurry to fill the micro-pores in the clay formed when gas escapes form the heated PU in the subsequent heating step.

Optionally, a mineral fiber is also mixed in the slurry, for example, in the amount of 1-5 wt %.

After coating, the slurry is allowed to dry. Then, pre-bake the substrate with the dried slurry in a low-temperature (250 C to 400 C) kiln for about 2 to 4 hours. The process slowly vaporizes the polymer substrate without compromising the structural strength of the ceramic skeleton.

Upon completion of the vaporizing process, raise the kiln temperature to the sintering temperature of the specific ceramic clay formula to bake the substrate for a further time period of about 2 to 8 hours. For the ceramic slurry examples given above, the sintering temperature is about 850-1250 C.

The two-stage baking process may be is continuous baking with two stages of temperature, i.e., after the first baking stage, the temperature of the kiln is raised directly without a cool-down period.

Alternatively, the two-stage baking process may include a cool-down period between the two baking stages where the product of the first (relatively low temperature) baking stage is allowed to cool down, for example to room temperature. Then, before the second (relatively high temperature) baking stage, the product of the first baking stage is placed in a ceramic slurry, preferably with ultrasonic waves applied to the slurry using an array of ultrasonic transducers. The ceramic slurry used in this step may be similar to the one used in the previous coating step, preferably with the addition of 1-5% ceramic fiber. This will cause the micro-pores of the product, which result from escaping gas from vaporized PU substrate, to be filled with reinforcement materials, which will make the final reticulated ceramic structure stronger. This process may be more preferred, especially for making larger size electrodes.

Figure 5:
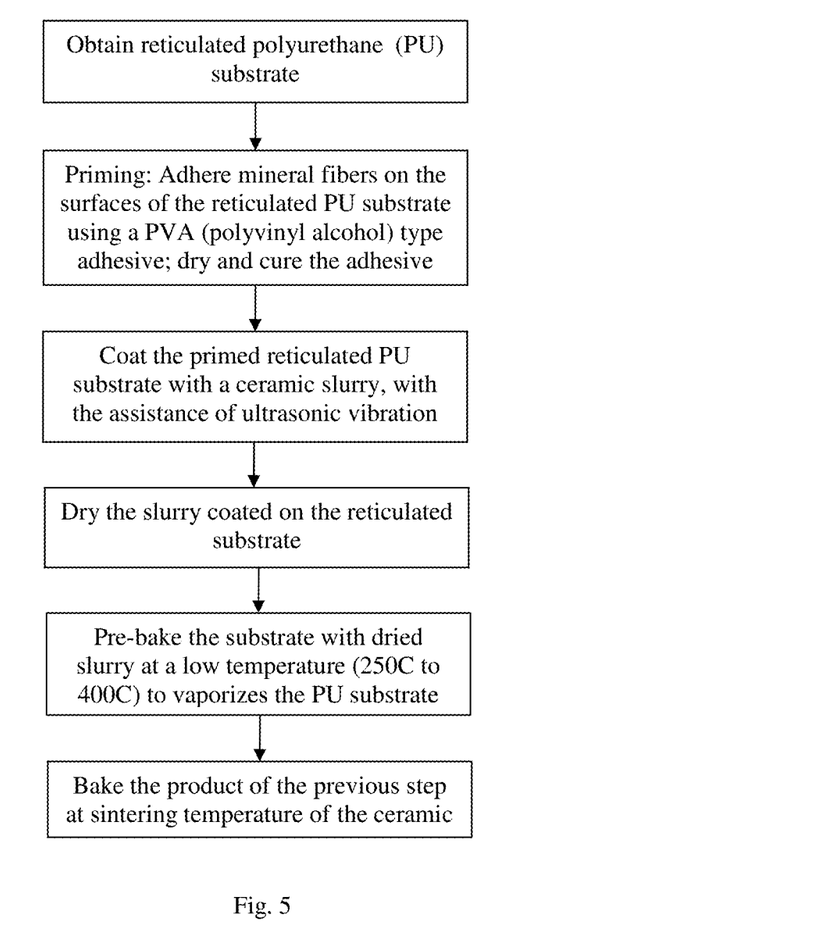
FIG. 5 schematically illustrates a method for fabricating a reticulated ceramic plate according to a second embodiment of the present invention.
Figure 7A:
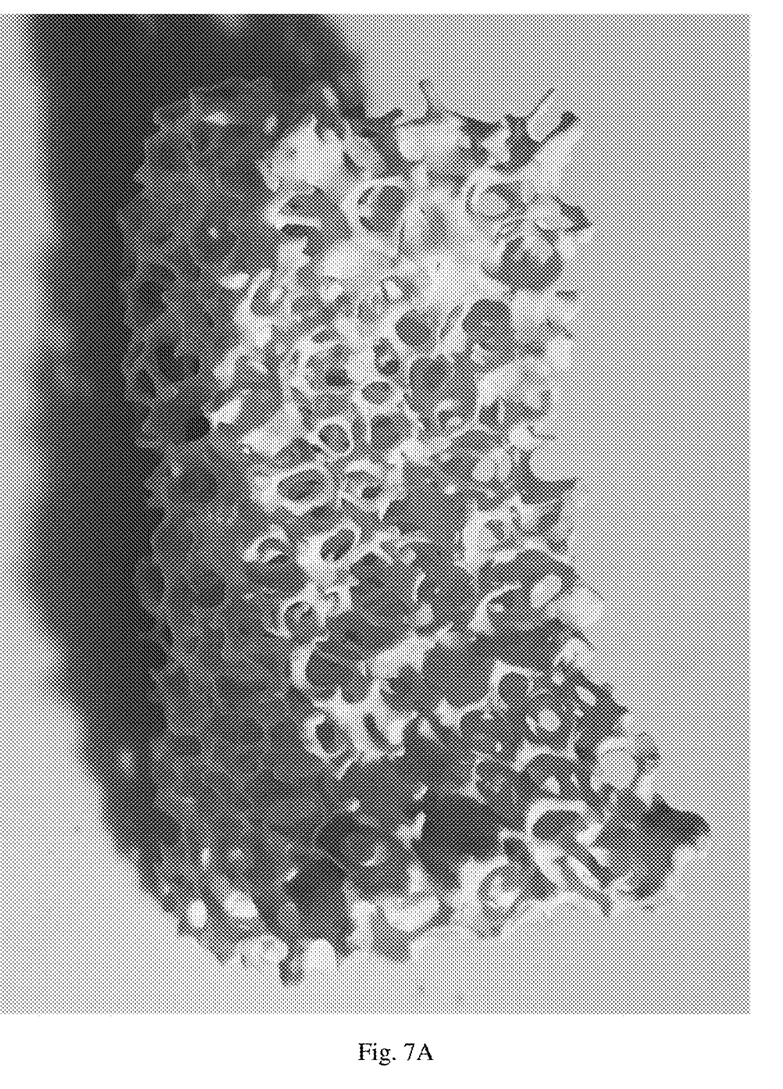
FIGS. 7A and 7B are photographs showing two examples of reticulated ceramic materials formed by the method of the second embodiments.
Figure 7B:
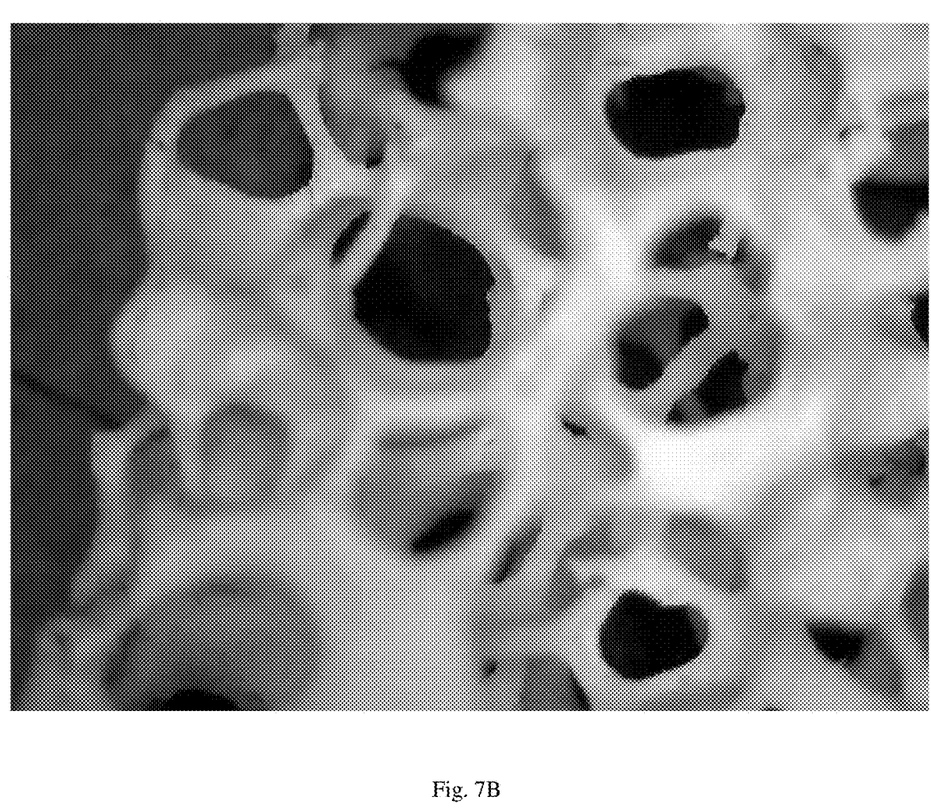

This completes the process of forming the reticulated ceramic substrate for the electrode. The process is summarized in FIG. 5. FIGS. 7A and 7B are photographs showing two examples of reticulated ceramic materials formed by the method of the second embodiments. The two examples respectively have pore densities of about 10 pores per inch and about 30 pores per inch. The reticulated ceramic substrate formed by this process may be used to make the electrode as described in the first embodiment.

Third Embodiment: Method of Making a Positive Electrode for Lead-Acid Battery from a Reticulated Lead Plate

In a fully discharged lead-acid battery, both electrodes are lead sulfate, $PbSO_4$. In a fully charged lead-acid battery, the negative electrode is Pb. Thus, the reticulated lead plate formed by the process of the first embodiment can be used as the negative electrode without any further processing. But the positive electrode in a fully charged battery is lead dioxide, $PbO_2$. The following method may be used to make the $PbO_2$ positive electrode from the reticulated lead plate which has been formed by the process of the first embodiment:

First, place the reticulated lead plate as negative electrode in a cell with an electrolyte ($HSO_4$), and discharge the cell completely so the negative electrode becomes $PbSO_4$ on the surface of the electrode. The half-cell chemical reaction for discharging is:

$$Pb(s)+HSO_4^-(aq) \rightarrow PbSO_4(s)+H^+(aq)+2e^-$$

Then, take the plate with $PbSO_4$ on its surface and place it as the positive electrode in a fully discharged cell, and bring the cell to full charge. This electrode plate becomes $PbO_2$ on the surface of the electrode, ready for assembly in a new battery cell. The half-cell chemical reaction for charging is:

$$2PbSO_4(s)+2H_2O(l) \rightarrow Pb(s)+PbO_2(s)+2H_2SO_4(aq)$$

Figure 8:
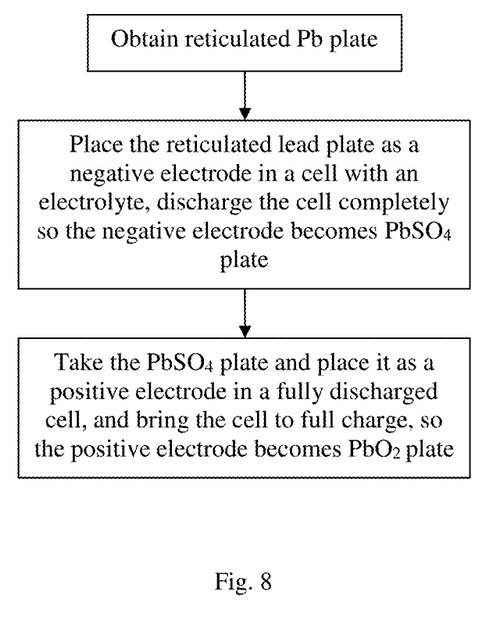
FIG. 8 schematically illustrates a method for fabricating a positive electrode for lead-acid battery from a reticulated lead plate according to a third embodiment of the present invention.

The process is summarized in FIG. 8.

Fourth Embodiment: Structure of Lead-Acid Battery Using the Lead Electrode Plates Made from the First to Third Embodiments In conventional lead-acid batteries, the electrodes are formed by providing a metal grid of pure lead or lead alloy, and coating the grid with a paste containing lead oxides followed with additional processing. The grid serves as the current conductor for the electrode. The electrodes made from the embodiments of the present invention do not have a separate current conductor structure. Rather, a reticulated lead plate formed using the embodiments described above is an integral piece of crystalline lead. The core of the lead layer of the reticulated structure remains pure lead and does not participate in the chemical reactions of charging and discharging. Thus, the core of the of the lead layer can serve as the current conductor, eliminating the need for a grid serving as the current conductor. This simplifies the battery structure, and is also advantageous because the metal grids (current conductor) in the conventional electrodes contribute to high internal resistivity.

Further, a reticulated PU structure may be used as the separators between the positive and negative electrodes. This structure has the following advantages: Because of the highly porous structure of the reticulated PU, the volume available for the electrolyte is increased as compared to conventional battery structures which uses materials such as rubber, glass fiber mat, cellulose, and PVC or polyethylene plastic as the separators. It also provides a more mechanically stable battery structure because the reticulated PU can act as a shock absorber.

It will be apparent to those skilled in the art that various modification and variations can be made in the reticulated lead (or other metal) electrode fabrication method and the related product of the present invention without departing from the spirit or scope of the invention. Thus, it is intended that the present invention cover modifications and variations that come within the scope of the appended claims and their equivalents.

What is claimed is:

1. A method for fabricating a reticulated electrode for a battery, comprising:
   obtaining a reticulated ceramic substrate;
   preparing a molten metal in a container;
   applying a DC voltage to the molten metal and the substrate;
   while the DC voltage is applied, placing at least a portion of the substrate in the molten metal;
   while the DC voltage is applied, withdrawing the portion of the substrate from the molten metal; and
   cooling the substrate.

2. The method of claim 1, wherein the molten metal is molten lead.

3. The method of claim 1, wherein the DC voltage is between 1 and 9 V.

4. The method of claim 1, wherein the step of applying a DC voltage to the molten metal and the substrate includes coupling a positive end of a DC voltage source to the molten metal, and coupling a negative end of the DC voltage source to the reticulated ceramic substrate.

5. The method of claim 4, wherein the container is made of an electrically conductive material, and wherein the positive end of a DC voltage source is coupled to the molten metal by a plurality of electrodes coupled to a plurality of locations of the container.

6. The method of claim 1, wherein the step of withdrawing the substrate from the molten metal is performed within one minute after the step of placing the substrate in the molten metal.

7. The method of claim 1, wherein the reticulated ceramic substrate is formed of one or more of silicon carbide, zirconium oxide, magnesia, and alumina.

8. The method of claim 1, wherein the reticulated ceramic substrate has a pore density of 10 to 90 pores per inch and a porosity of 70-95%.

9. The method of claim 1, wherein the metal includes one or more of: lead, zinc, copper, lithium, nickel, silver, lead-tin alloy, lead-antimony alloy, iron-manganese alloy, and amalgam.

* * * * *